(No Model.)

J. W. SHARP.
COMBINED LAND ROLLER AND MANURE DISTRIBUTER.

No. 508,123. Patented Nov. 7, 1893.

Witnesses
C. J. Williamson,
C. S. Trull.

Inventor
John W. Sharp,
by Franklin H. Hough
his Atty.

THE NATIONAL LITHOGRAPHING COMPANY,
WASHINGTON, D. C.

United States Patent Office.

JOHN WASHINGTON SHARP, OF CAVE CITY, ARKANSAS.

COMBINED LAND-ROLLER AND MANURE-DISTRIBUTER.

SPECIFICATION forming part of Letters Patent No. 508,123, dated November 7, 1893.

Application filed July 31, 1893. Serial No. 481,999. (No model.)

*To all whom it may concern:*

Be it known that I, JOHN WASHINGTON SHARP, a citizen of the United States, residing at Cave City, in the county of Sharp and State of Arkansas, have invented certain new and useful Improvements in a Combined Land-Roller and Manure-Distributer; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in manure-spreaders, and it has for its object to provide a land-roller which is adapted to serve as a hopper or receptacle for manure; the interior of the roller being provided with cutting blades adapted to act in conjunction with corresponding blades carried by the fixed axle, whereby the manure will be thoroughly cut or pulverized.

The invention has for a further object the provision of means whereby the manure, after having been thoroughly mixed and cut or pulverized, will be evenly distributed in the row; means being provided for insuring a perfect regulation of the amount of manure distributed.

To these ends and to such others as the invention may pertain, the same consists in the novel construction of the device, as hereinafter described; and in the peculiar combination, arrangement and combination of parts, all as more fully hereinafter described and claimed.

The invention is clearly illustrated in the accompanying drawings, which, with the letters of reference marked thereon, form a part of this specification, and in which drawings—

Figure 1:
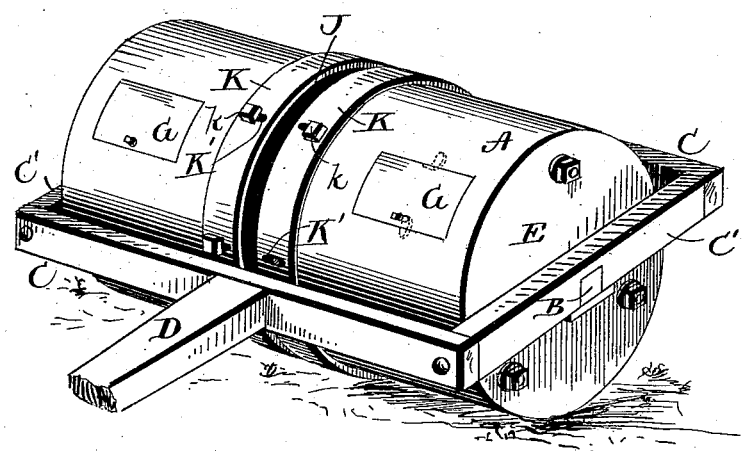
Figure 2:
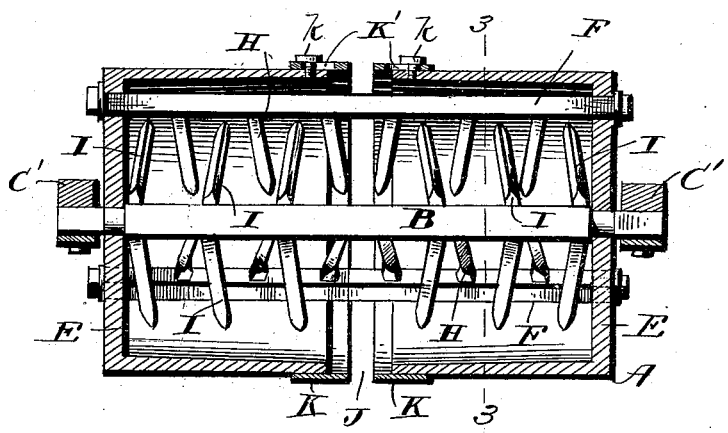
Figure 3:
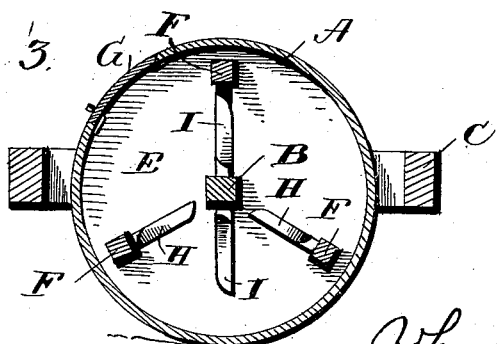

Figure 1 is a perspective view of a combined land-roller and manure-spreader embodying my invention. Fig. 2, is a central longitudinal section of the same. Fig. 3, is a cross-section on the line 3, 3 of Fig. 2.

Reference now being had to the details of the drawings by letter, A designates the roller, which is journaled loosely upon a fixed axle B, the ends of which axle are attached to the side timbers C' of the rectangular frame C, to which frame is attached the pole D.

The roller A is hollow, and is provided with heads E, E, at its ends, connecting which heads at intervals of the periphery of the roller, are timbers F, F', which timbers form the supports for the outer covering of the roller, which covering may be of metal, and of sufficient thickness to afford the necessary weight to the roller. The outer covering of the roller is provided with doors G through which access is had to the interior.

H, H, are knives which are attached to the inner faces of the timbers F, at intervals of the length of said timbers. These knives extend in the direction of the axle and their free ends terminate near the same.

I, I, are knives similar to the knives H, excepting that they are carried by the axle, and are arranged to mesh with the knives H, the cutting edges of the two sets of knives H, H, and I, I, being in opposite directions, so as to act against each other, as will be readily understood.

At its longitudinal center the roller is provided with a peripheral opening J, and upon each side of this opening, upon the inner face of the roller, are placed metallic hoops or bands K, said bands being adjustable, toward and from the peripheral opening J, by means of set-screws k, k, which are passed through elongated slots K' in the said bands and through corresponding openings in the covering of the roller.

It will be observed that the knife blades H and I are slightly inclined in the direction of the peripheral slot J, so that as the roller turns the tendency will be to force the manure, after it has been acted upon by the knives, in the direction of the longitudinal center of the roller, where it passes out through the peripheral opening J. It will be seen that by this arrangement, the manure, which is placed in the roller through the door provided for the purpose, will be thoroughly cut and be evenly distributed in a line along the furrow or row. The adjustment of the bands at the sides of the peripheral opening permits the width of the opening to be regulated at pleasure. The manure is therefore distributed without waste, and by the action of the roller the land is leveled and left in the best possible condition without the necessity of rolling afterward.

Having thus described my invention, what I claim to be new, and desire to secure by Letters Patent, is—

In a device of the character described, in combination, the fixed axle, the frame, the roller loosely journaled upon the axle and having a central peripheral opening, adjustable bands upon the roller adapted to be moved so as to regulate the width of the said opening, the knives H, H, carried by the roller and knives I. I upon the axle, substantially as described.

In testimony whereof I affix my signature in presence of two witnesses.

JOHN WASHINGTON SHARP.

Witnesses:
J. L. JONES,
J. C. JONES.